United States Patent [19]

Stewart et al.

[11] Patent Number: 5,383,716
[45] Date of Patent: Jan. 24, 1995

[54] QUICK-RELEASE BICYCLE AXLE FASTENER

[75] Inventors: John V. Stewart, Orlando, Fla.; Cal M. Phillips, Platteville, Wis.

[73] Assignee: S.A.F.E.-Q.R. Corporation, Platteville, Wis.

[21] Appl. No.: 122,724

[22] Filed: Sep. 16, 1993

[51] Int. Cl.⁶ ............................................. B60B 27/00
[52] U.S. Cl. ............................. 301/124.2; 301/110.5
[58] Field of Search ............... 301/105.1, 110.5, 124.2, 301/125, 111; 280/279, 288

[56] References Cited

U.S. PATENT DOCUMENTS

| | | | |
|---|---|---|---|
| 2,630,020 | 3/1953 | Juy | 74/242.14 |
| 3,922,018 | 11/1975 | Shook | 301/105 |
| 4,033,627 | 7/1977 | Morroni | 301/111 |
| 4,079,958 | 3/1978 | Segawa | 280/279 |
| 4,400,038 | 8/1983 | Hosokawa | 301/111 |
| 4,679,862 | 7/1987 | Luo | 301/112 |
| 4,724,692 | 2/1988 | Turia et al. | 70/225 |
| 4,763,957 | 8/1988 | Poehlmann et al. | 301/124.2 X |
| 4,770,011 | 9/1988 | Constant | 70/225 |
| 4,789,206 | 12/1988 | Ozaki | 301/111 |
| 4,805,941 | 2/1989 | Downing | 280/279 |
| 4,906,053 | 3/1990 | Kawai | 301/105 B |
| 4,964,287 | 10/1990 | Gaul | 70/233 |
| 5,121,973 | 6/1992 | Phillips | 301/105 B |

FOREIGN PATENT DOCUMENTS

| | | | |
|---|---|---|---|
| 441058 | 3/1948 | Italy . | |
| 460058 | 10/1950 | Italy . | |
| 0463954 | 2/1952 | Italy | 301/124.2 |
| 341220 | 1/1931 | United Kingdom . | |

*Primary Examiner*—Russell D. Stormer

[57] ABSTRACT

A quick-release axle attachment mechanism for velocipeds and motorcycles. It has a cam lever 1-5 on each end of the axle 49. The cam rotation axis is perpendicular to the axle. The cam pushes a slide 15 inward against the drop-out 43, clamping the drop-out against the bearing jam nut 51. When the cam is rotated for wheel removal, a spring 13 continues to hold the slide against the drop-out. A safety tab 47, or other coupling surface on the drop-out, engages the slide to prevent wheel removal until the slide is pulled outward with the fingers. To remove a wheel, both cams are rotated to the slack position, then both slides are pulled outward. The double safety interlock of the two slides prevents accidental wheel release. The cam lever can be made of plastic.

15 Claims, 6 Drawing Sheets

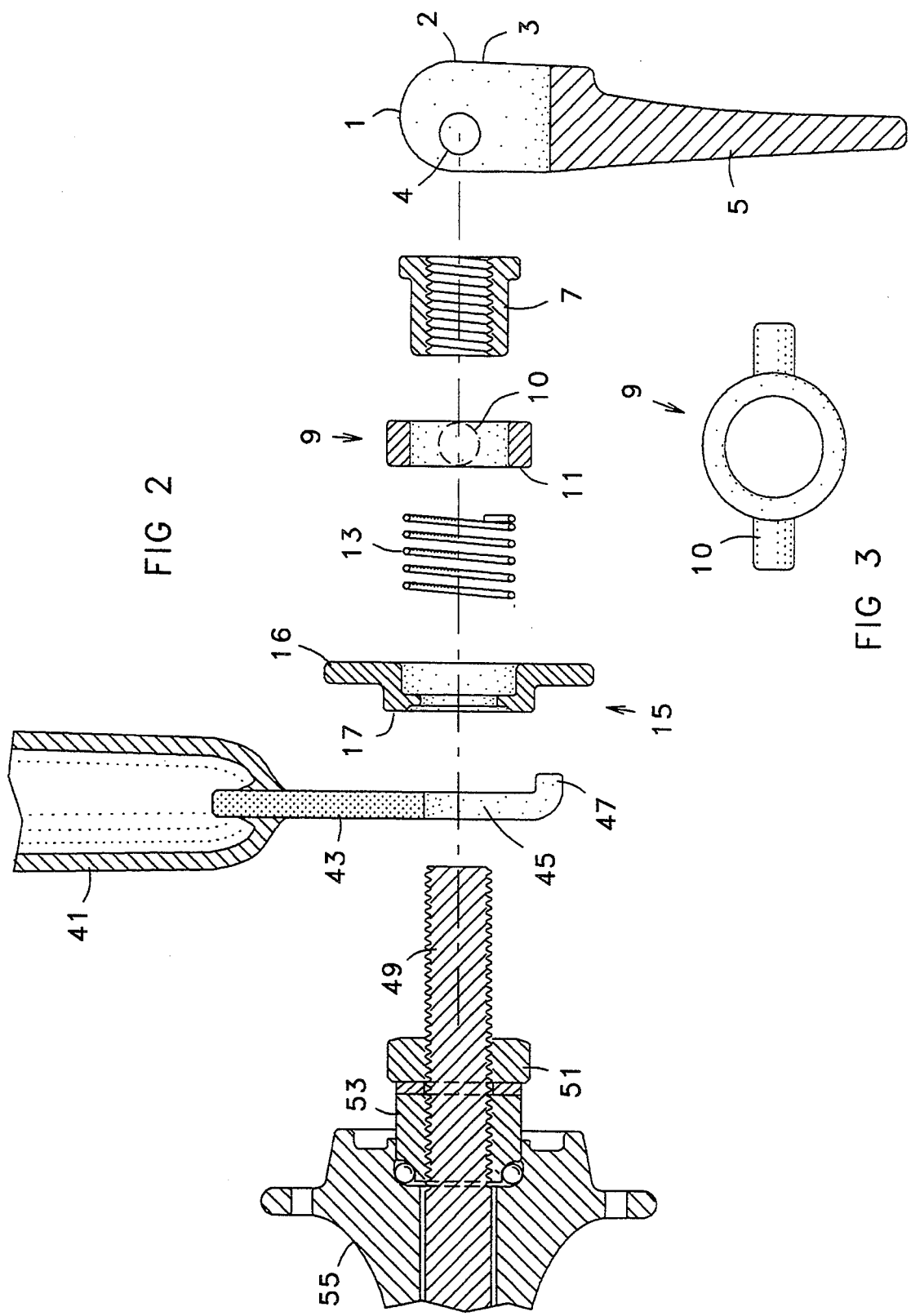

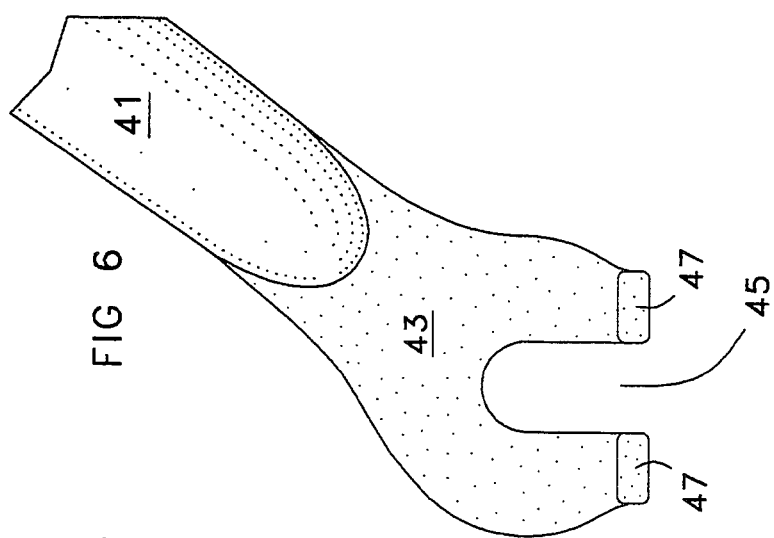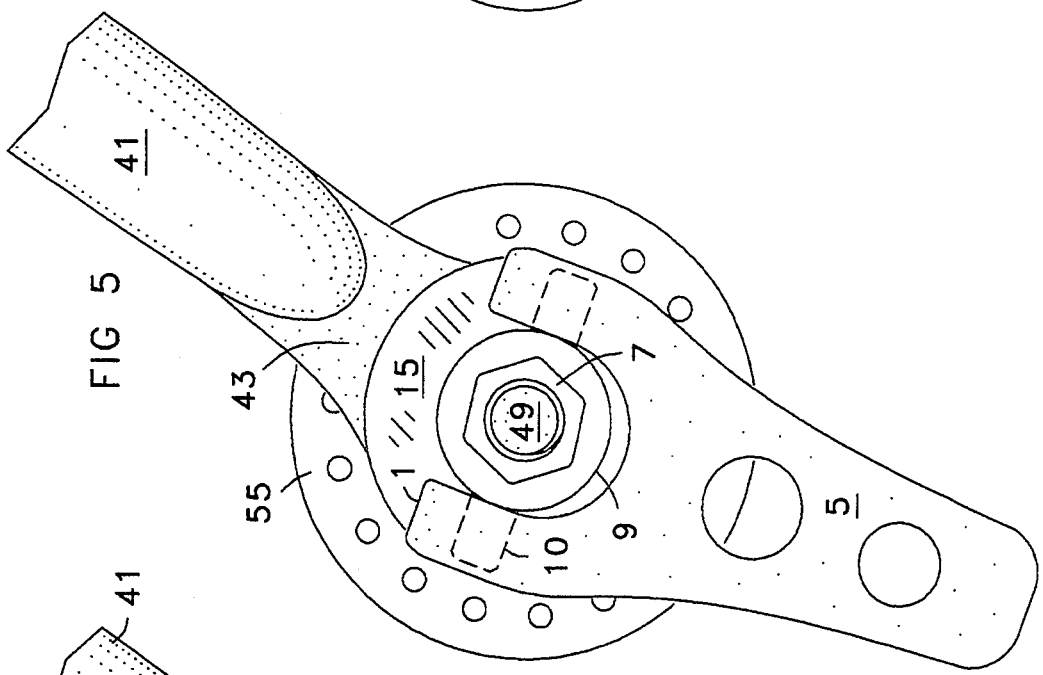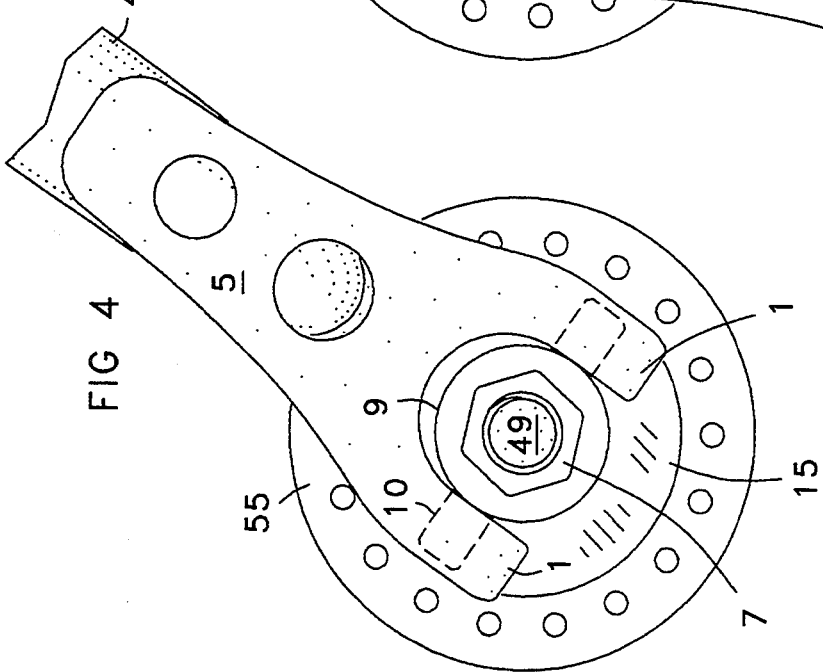

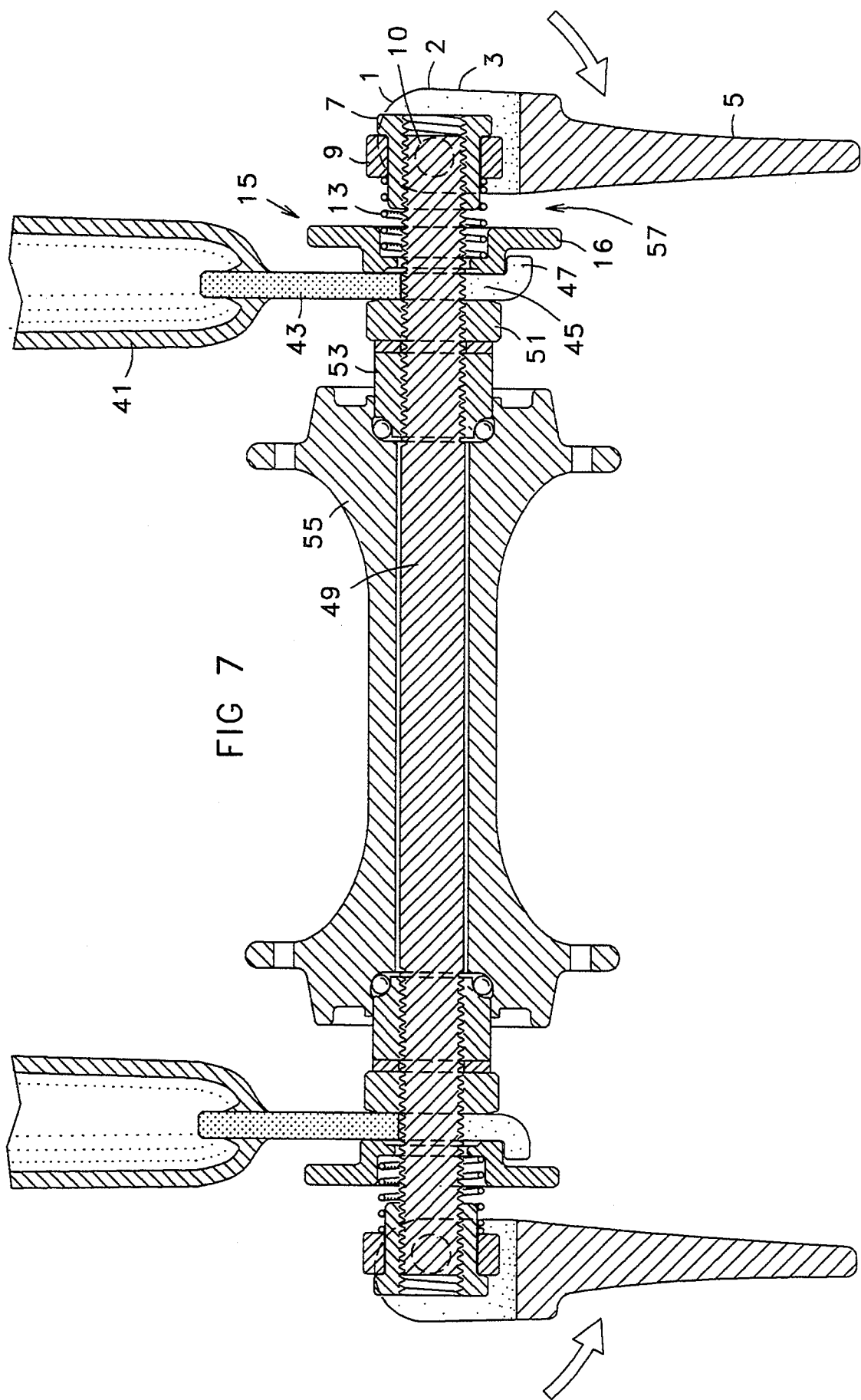

QUICK-RELEASE BICYCLE AXLE FASTENER

RELATED PATENT

A related U.S. Pat. No. 5,121,973, titled "Push Button Quick Release Safety Hub Assembly", was issued Jun. 16, 1992 to Cal M. Phillips.

BACKGROUND

1. Field

This invention is in the field of velocipeds (pedal-powered wheeled vehicles) and motorcycles, related to their axle fastening hardware.

2. Prior art

Wheel axles are attached to a bicycle frame by various means. Threaded nuts are the simplest, but require wrenches, making them inconvenient and slow. They are subject to loosening or stripped threads, which can cause loss of control while riding.

Quick-release axle fasteners allow attachment and removal of a wheel axle without tools. This speeds the repair of flat tires, and simplifies the partial disassembly of bicycles for storage and transport. However, prior quick-release fasteners are subject to accidental release from impacts or improper operation. Common operation errors are: incomplete rotation of the cam lever; misalignment of the axle; and misadjustment of clamping tension of the fastener. Most quick-release axle fasteners require a hollow axle, and include a control rod passing through the axle. This rod can be overstressed if the tension of the fastener is too high. It then breaks, instantly disengaging the axle from the frame. If clamping tension is too low, the axle slips out of alignment or disengages from the frame. These mistakes cause accidents. Thus, the advantages of quick-release hubs have been offset by critical disadvantages. Variations of the lever-operated clamping design have been developed with safety in mind, but they all have weaknesses.

The quick-release hub of U.S. Pat. No. 4,400,038 (Hosokawa) has a safety mechanism which prevents axle release until the cam lever is fully rotated. However, in the partly rotated position, it is susceptible to release from impacts. The present invention is safer, since it requires the release of two levers and two slides, and the slides are not susceptible to impacts. Hosokawa has a higher number of different parts than the present invention, including a hollow axle and control rod, which are expensive.

The quick-release hub of U.S. Pat. No. 4,964,287 (Gaul) uses a cam with a removable lever or key for security. The key or lever can be lost. The cam position is hidden, so the user could assume the cam is engaged when it is not. Gaul has a higher number of different parts than the present invention, but no safety interlock. His lock-down washers 26, 28 do not serve this function, since they do not hold the axle in the drop-out when the cam is released. Thus, the present invention is safer, yet simpler. The quick-release hub of U.S. Pat. No. 4805941 (Segawa, FIGS. 4, 5) offers a safety interlock. His clamping mechanism needs enough range to fully relax the spring 6 of the interlock, since no radial lip is provided for its disengagement from the drop-out with the fingers. Thus, his interlock is inactive when it is needed most, in the released position of the cam lever. When partially rotated, his cam lever is releasible by impact or vibration, defeating the safety. The safety interlock in the present invention protects even in the fully released position of the cam lever. The quick-release hub of U.S. Pat. No. 4,805,941 (Downing) has a safety hook for holding the axle in the drop-out. However, it requires a specialized drop-out with the hook assembly, it can be released by impacts, is vulnerable to damage, and engagement of the hook is optional. The present safety uses conventional drop-outs, will not release from impacts, is not vulnerable to damage, and the safety interlock is not optional.

OBJECTIVES AND SUMMARY

Objects

The object of this invention is a simple, safe, convenient quick-release mechanism for bicycle axles, having the following advantages:

1. Fast, safe wheel removal and attachment without tools.
2. Double safety interlocks to prevent accidents.
3. Levers that lock with tangible confirmation.
4. No adjustments needed after assembly.
5. Lighter than current quick releases.
6. Less expensive than current quick-releases.
7. Can use either hollow or solid axles of all diameters.
8. No control rod to break, bend, or adjust.

Summary

All of these objects are met in the present invention. It has a cam 1 with a lever 5 on each end of the axle. The rotation axis of the cam is perpendicular to the axle. The cam pushes a safety slide 15 inward against the drop-out 43, clamping the drop-out against the bearing cone jam nut 51. As shown in FIG. 7, the cam is rotated to release clamping pressure for wheel removal, but spring 13 continues to press the slide against the drop-out. A safety tab 47, or other coupling surface, on the drop-out, engages the slide to prevent wheel removal until the slide is pulled outward with the fingers (FIG. 8). To remove a wheel, both cams are rotated to the loose position, then both slides are pulled outward. This double safety interlock prevents accidental wheel release. The cam lever can be made of plastic.

This device is safer, less expensive, and lighter than current quick-releases. It has no control rod, and does not require a hollow axle. Its dual lever design is easy to use, and needs no adjustment after assembly. Dual spring-loaded safety slides prevent unexpected wheel loss, even if both levers are accidentally left in the unlocked position.

DRAWINGS

FIG. 2 Shows an exploded front sectional view of fastener parts in the preferred embodiment.

FIG. 3 Shows an end view of the cam support.

FIG. 4 Shows a side view of FIG. 1.

FIG. 5 Shows a side view with cam lever 1-5 in the released position.

FIG. 6 Shows a side view of drop-out.

FIG. 7 Shows a view as in FIG. 1, with lever 5 in the released position.

Figure 1:
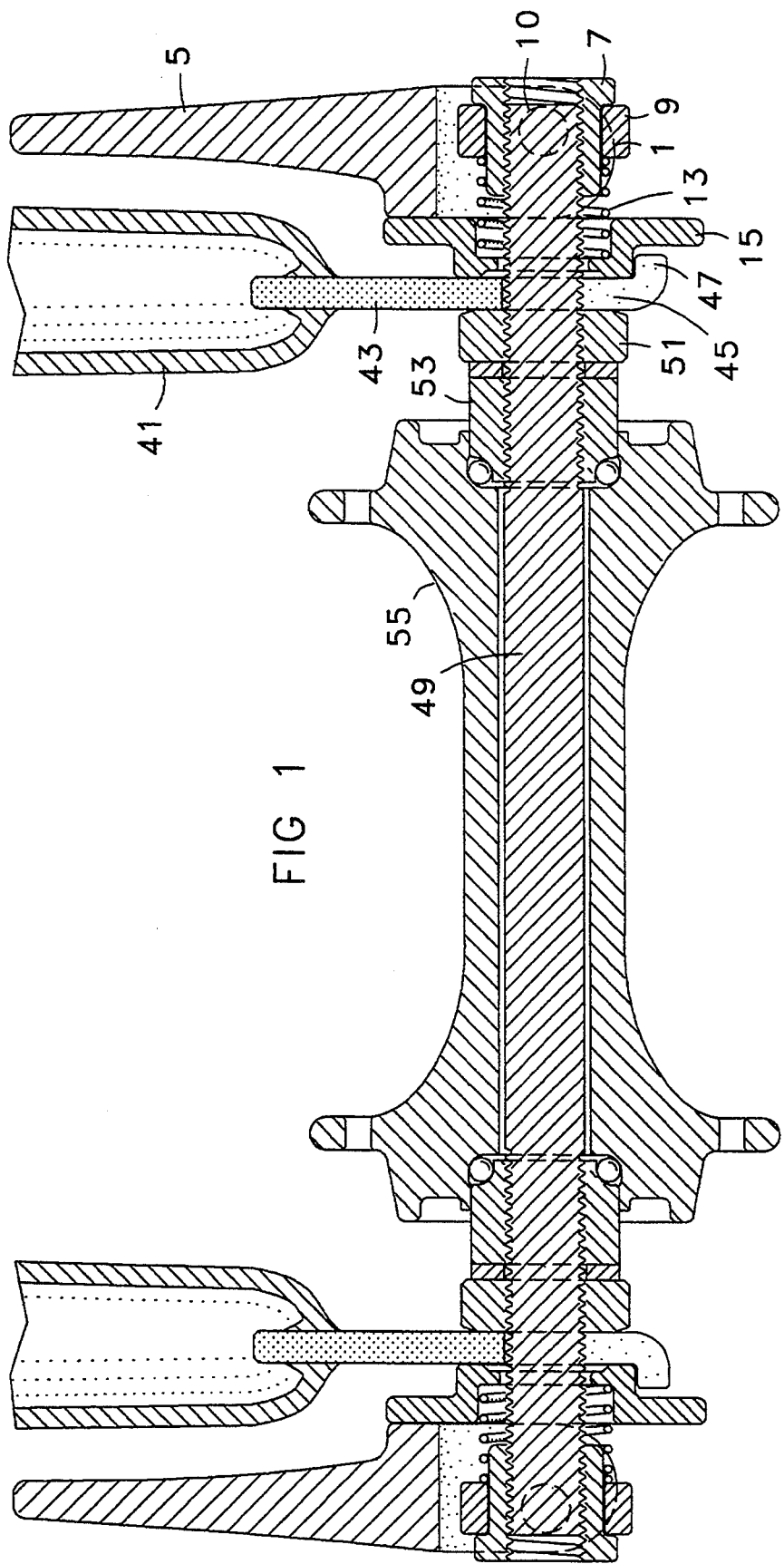
FIG. 1 Shows a front sectional view of a wheel hub mounted on a bicycle fork, with the cam/lever (elements 1-5) in the locked position.
Figure 8:
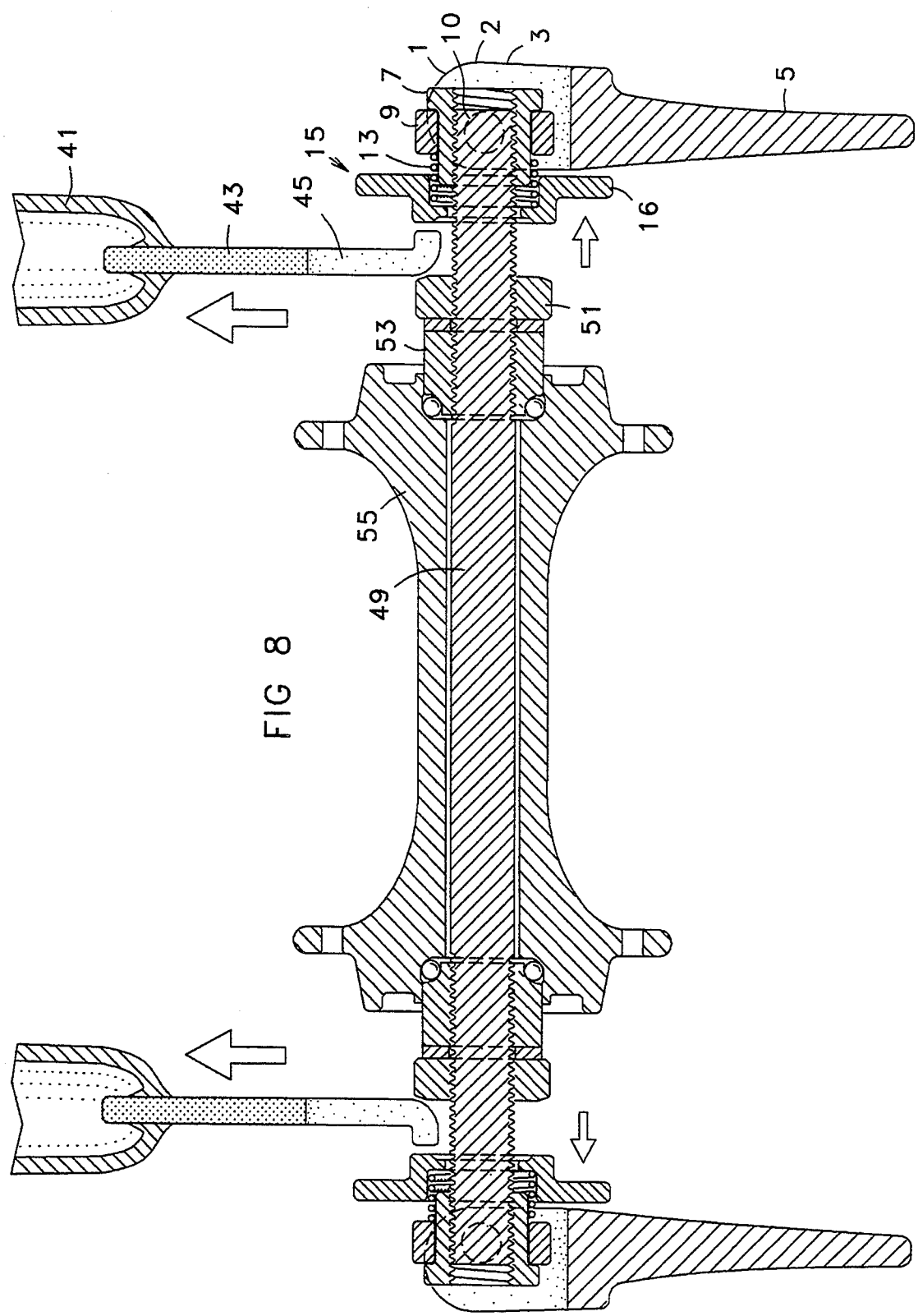

FIG. 8 Shows a view as in FIG. 1, with slides 15 pushed outward and the axle 49 released from the drop-out 41.

Figure 9:
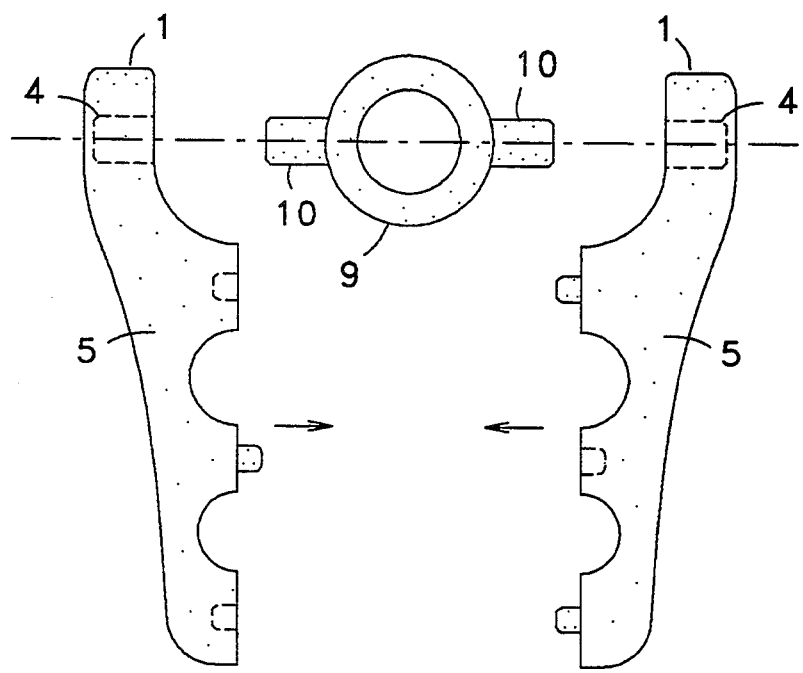

FIG. 9 Shows assembly of cam/lever made in two halves

Figure 10:
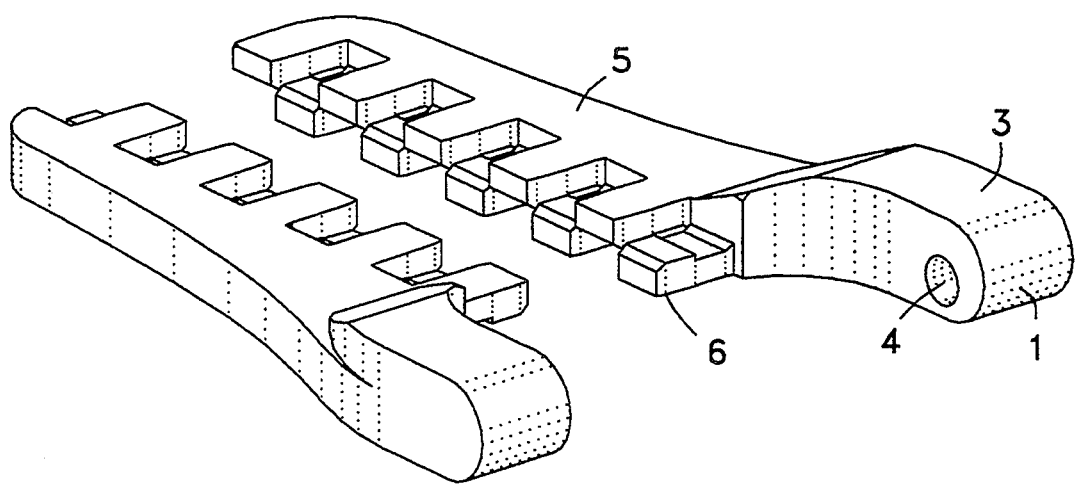

FIG. 10 Shows a cam lever embodiment that can be snapped together over pivot pin without glue, via interlocking teeth 6

REFERENCE NUMERALS

1. Cam
2. Cam apex
3. Flat portion of cam
4. Journal for pivot pin
5. Lever
6. Hook tooth on snap-together version of lever
7. Self-locking nut
9. Cam support
10. Cam pivot pin
11. Spring retainer
13. Spring
15. Slide, or safety interlock
16. Radial lip on slide
17. Inner surface of slide
41. Bicycle fork
43. Drop-out
45. Open-ended slot
47. Safety tab or other coupling surface on drop-out
49. Axle
51. Jam nut
53. Bearing cone
55. Hub
57. Clearance between slide and drop-out for release of inter lock

TERMINOLOGY axial—parallel to, or coincident with, the axis of the wheel axle.
cam lever—the combination of a cam and attached operating lever
drop-out—axle-support plate with an open-ended slot, on frame of vehicle.
inner—that which is closest to the middle of the axle.
inward—toward the middle of the axle.
inboard—positioned closer to the middle of the axle.
outer—that which is farthest from the middle of the axle.
outward—away from the middle of the axle, toward or beyond its end.
radial—perpendicular to the axis of the wheel axle.
skewer—control rod through hollow axle on prior quick-release axles.
tangible—perceived by the sense of touch.
vehicle—a wheeled vehicle, especially a velociped or motorcycle.
velociped—a pedal powered wheeled vehicle.

DESCRIPTION

FIG. 1 shows a front sectional view of a bicycle fork, having drop-outs 43. A wheel axle 49 is mounted in open-ended slots 45 in the drop-outs via the present fastener. A cam 1 is pivot mounted on each end of the axle. The cam forces a slide 15 inward, clamping the drop-out between the slide and the bearing hardware 51. This firmly holds the axle in the drop-out. The cam is held in the engaged position by its friction against the slide. This is enhanced by a flat spot 3 on the cam (see FIG. 2) just beyond its apex 2, which provides a stable engaged position. Attainment of this position is felt by the user when lever 5 is rotated, since the cam stabilizes on it. The cam/lever is preferably made of plastic, providing elasticity which causes the cam to jump past its apex onto the flat portion.

FIG. 2 shows an exploded sectional view of the parts in the preferred embodiment. Part numbers above 40 are generally Conventional. Cam 1 is mounted on cam support 9 by two pivot pins 10. The cam/lever can be made in halves as in FIG. 9, each half having a journal 4 which slips over a pin 10 on the cam support, then the halves are fastened together. Assembly of the mechanism on the end of an axle includes the following steps:
1. Slide 15 is slipped onto the axle against jam nut 51.
2. Spring 13 is slipped onto the axle against the slide.
3. Cam support 9 is slipped onto self-locking nut 7.
4. Self-locking nut 7 is threaded onto the axle with a wrench and adjusted for cam pressure.

The self-locking nut has internal threads that grip the axle with conventional anti-loosening means such as a thread coating, or plastic insert. The cam support rotates freely on the self-locking nut when the cam is not engaged against the slide. This lets the user position the levers as desired without affecting the cam adjustment, and prevents loss of adjustment.

Safety tab 47 is a type of coupling surface commonly found on drop-outs to avoid accidental wheel loss. Another type (not shown) is a hole in the drop-out to receive an inward-facing safety tab provided on a washer that is installed on the axle between the drop-out and a threaded nut. The present invention can be adapted to any coupling surface, via a complimentary surface on the inner end of the slide. A tab 47 as shown, or a circular lip as next described, is preferred. With these types of coupling surfaces, the slide only needs a cylindrical end that does not require orientation.

Some drop-outs have lips extending outward below the installed axle, in a circular shape centered on the axle. These drop-outs are preferred for the present invention, wherein the inner end of the safety slide is cylindrical, and fits within the inner diameter of the circular lip. The amount of radial clearance between the slide and lip determines the amount of wheel alignment adjustment that is allowed.

FIGS. 5 and 7 show lever 5 in the released position. Slide 15 is still engaged with safety tab 47 on the drop-out via spring 13, preventing accidental wheel release from the drop-out. To release the axle from the drop-out, as in FIG. 8, the user pulls the two slides 15 away from the drop-out with the fingers.

The embodiment shown is a practical implementation of the invention. However, different hardware details can be employed for equivalent results. For example, for mounting the cam on the axle, a hole can be drilled through the end of the axle, perpendicular to its axis, to receive a pivot pin. This pin is pushed through both sides of the cam 1, and through the axle between them. The pin can be fixed via a head on one end and circlip on the other. To provide adjustability, the pin hole in the axle can be elongated axially. A nut, with two opposed radial holes for the pin, can be threaded over the axle until the holes align with the slot at the desired axial position. The pin goes through both sides of the cam, both sides of the nut, and the axle.

PREFERRED EMBODIMENT

The preferred embodiment is as shown in FIGS. 1-9.

OPERATION

Wheel Installation
1. Pull outward on each safety interlock as axle is inserted into the drop-out.

2. Align wheel, and pivot each lever to its locked position.

Wheel Removal

1. Pivot both levers to the release position.
2. Pull outward on each slide and let the axle slip out of the drop-out.

SCOPE

Specifics in the description and drawings illustrate the preferred embodiment of the invention. The invention is not limited to this particular hardware, and changes may be made therein without departing from the invention, which is defined by the claims and their legal equivalents.

I claim:

1. A mechanism for attaching a wheel axle to a vehicle frame, the frame having a drop-out with an open-ended slot for receiving the axle, the drop-out having a coupling surface, the mechanism comprising:
   a cam, mounted pivotally on an end of the axle, having a pivot axis substantially perpendicular to the wheel axle;
   a lever attached to the cam;
   a slide, mounted on the axle inboard of the cam, having a radial lip for axial movement of the slide by human fingers, and an inner surface of complementary shape to the coupling surface for mating therewith; and
   a spring, mounted between the slide and the cam.

2. The mechanism of claim 1, wherein the cam has a flat spot adjacent its apex for stabilizing the cam in the engaged position via the flat spot pressed against the slide.

3. The mechanism of claim 1, wherein the coupling surface is a tab extending outward from the outer surface of the drop-out beside the open end of the slot, and the complementary surface is a shape that fits above the tab, and rests upon it, when the axle is fully inserted in the slot.

4. The mechanism of claim 1, wherein the cam is mounted on the axle by a cam support which has a spring retainer on its inner end, and the spring is mounted between the slide and the spring retainer.

5. The mechanism of claim 4, wherein the cam support has two diametrically opposed pivot pins, substantially perpendicular to the wheel axle, extending radially outward therefrom, the cam and lever are constructed of two halves, each half has a journal for mounting on a pivot pin, and the two halves are joined by an interlocking seam.

6. The mechanism of claim 5, wherein the interlocking seam comprises two rows of hooked teeth on each half of the lever, the teeth spaced alternately along each lever, with the hooks facing alternately, such that the teeth form a mesh of coupled hooks when the two halves of the levers are pressed together.

7. The mechanism of claim 4, wherein the cam support has two diametrically opposed journals, with open ends facing radially outward therefrom, the cam is C-shaped, with a pivot pin extending radially inward from each end point of the "C", the ends of the pivot pins are closer together than the outer ends of the journals, and the cam is attached to the cam support by flexing the "C" wide enough to insert the pins in the journals.

8. A quick-release axle fastener for a wheeled vehicle with a frame, the frame having a drop-out with an open-ended slot for receiving an axle, the fastener comprising:
   a coupling surface on the drop-out;
   a wheel axle;
   a cam lever pivotally mounted on an end of the axle, having a pivot axis perpendicular to the axle, a cam which is eccentric about the pivot axis, and a lever attached to the cam;
   a slide, mounted for axial movement on said end of the axle inboard of said cam, the slide having a radial lip large enough to be gripped by human fingers, an outward-facing surface which engages the cam, and an inward-facing surface which engages the coupling surface of the drop-out; and
   a spring urging the slide inward;
   whereby the drop-out receives the axle inboard of the slide, rotation of the cam lever in one direction pushes the slide inward against the drop-out, and rotation of the cam lever in the other direction releases the slide, allowing it to be pulled outward against the spring force with the fingers, away from the coupling surface of the drop-out.

9. The fastener of claim 8, wherein the cam has a flat spot adjacent its apex for stabilizing the cam in the engaged position, via the flat spot pressed against the slide.

10. The fastener of claim 9, wherein the cam is made of a semi-elastic material.

11. The fastener of claim 8, wherein the coupling surface is a safety tab projecting outward from the drop-out beside the open end of the slot.

12. The fastener of claim 8, wherein the radial lip comprises a circular flange on the outboard end of the slide.

13. The fastener of claim 8, further comprising a self-locking nut with a radial flange on its outer end, threaded on the end of the axle, a cam support journaled onto the nut inboard of the flange, having two diagonally opposed pins extending radially therefrom for pivotal mounting of the cam, and wherein the cam comprises two lobes, each journaled to one of the pins.

14. In combination with a wheeled vehicle having a wheel axle and a drop-out with an open-ended slot, a fastener for attaching the axle to the drop-out, within the slot, the fastener comprising:
   a rotatable cam attached to an end of the axle, having a pivot axis substantially perpendicular to the wheel axle;
   a lever attached to the cam;
   a slide mounted on the axle, inward from and adjacent to the cam, the slide having a radial lip for axial movement of the slide, relative to the axle, by human fingers;
   a spring mounted against the slide, urging the slide inward;
   a coupling surface on the drop-out; and
   a complementary surface on the slide which mates with the coupling surface, preventing radial movement of the slide, and thus the axle, out of the slot.

15. The fastener of claim 14, wherein the cam has a flat spot adjacent its apex, for stabilizing the cam in the engaged position via the flat spot pressed against the slide.

* * * * *